July 27, 1948.    W. E. BRADLEY    2,445,996
FREQUENCY MODULATION DETECTOR CIRCUIT
Filed Jan. 13, 1945    2 Sheets-Sheet 2

INVENTOR.
William E. Bradley
BY Darby + Darby
ATTORNEYS

Patented July 27, 1948

2,445,996

UNITED STATES PATENT OFFICE 2,445,996

FREQUENCY MODULATION DETECTOR CIRCUIT

William E. Bradley, Swarthmore, Pa., assignor, by mesne assignments, to Philco Corporation, Philadelphia, Pa., a corporation of Pennsylvania Application January 13, 1945, Serial No. 572,669

7 Claims. (Cl. 250—27)

The present invention relates to a frequency or phase detector for use in the reception of frequency or phase modulated signals and particularly to such a detector which is not responsive to variation in the amplitude of the detected signals and is linear over a substantial range of frequency of the incoming signal.

In prior frequency modulation receivers, it has been customary to provide an amplitude limiter and a separate discriminator-detector and furthermore, it has been difficult to construct a detector which is linear over the necessary operation range.

My present invention comprises utilizing a double electron discharge tube arrangement in which the tubes are biased class B amplifiers so arranged that each tube is cut off during a half cycle of the applied high frequency and so arranged that when, and only when, both tubes are cut off the plate potential rises linearly. Since the interval when both tubes are cut off varies linearly with the phase difference between the two applied high frequency waves the device comprises a linear phase detector.

It is an object of this invention to provide a phase detector which is not responsive to amplitude variations and is linear over a substantial phase range.

It is a further object of this invention to provide such a detector utilizing two electron discharge tubes adjusted so that when both tubes are cut off the common plate potential rises linearly, thereby giving a signal at audio frequency equivalent to the original modulating signal at the transmitting station.

Other objects and features of the invention will be apparent when the following description is considered in connection with the annexed drawings, in which—

Figure 1:
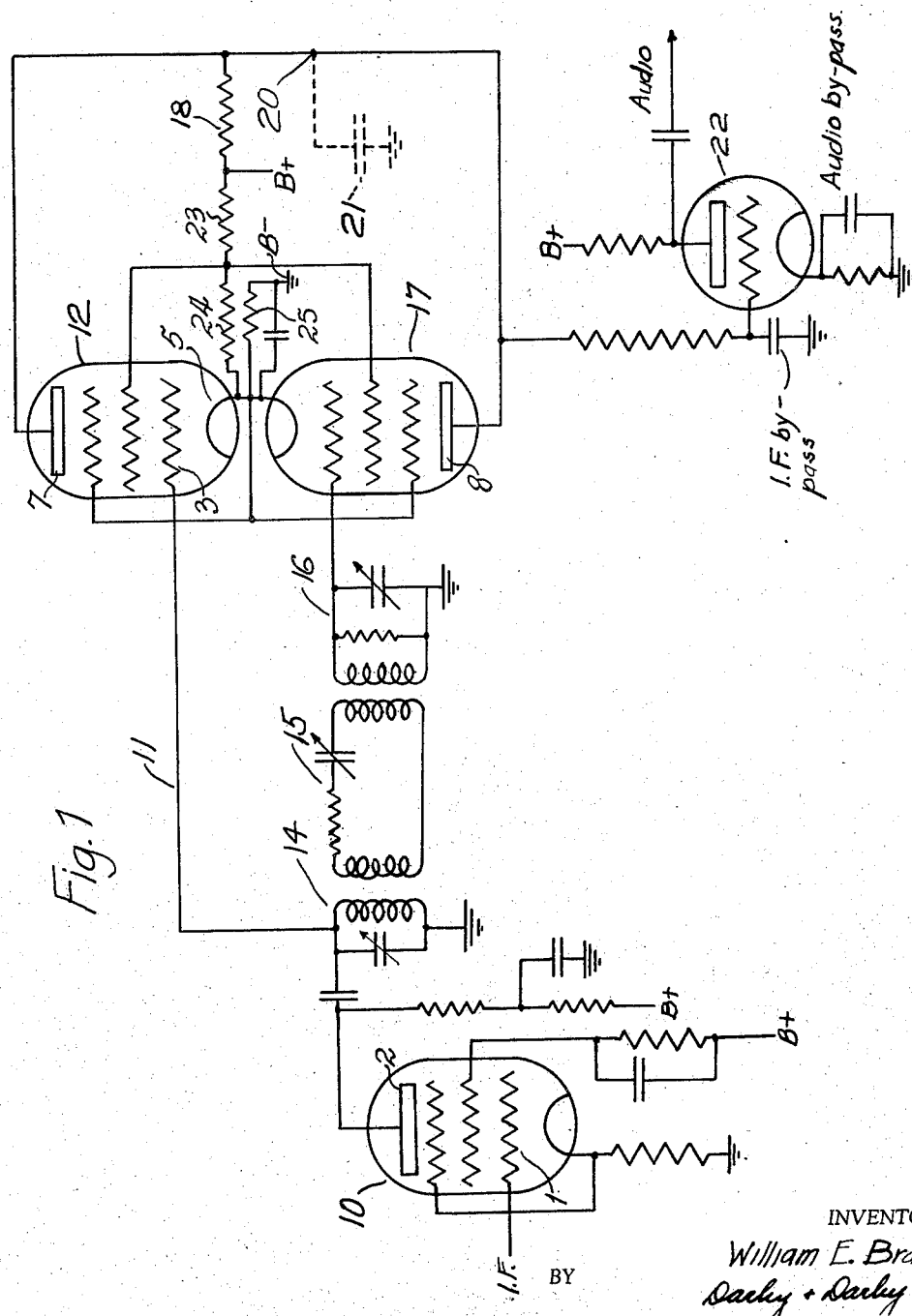
Figure 1 is a schematic drawing of the circuit of my double tube phase detector showing a suitable input circuit and a suitable output circuit.

Referring now to Figure 1, the intermediate frequency signal from the last intermediate frequency amplifier stage is applied to the control grid 1 of pentode 10 and the output of the tube 10 is applied from its anode through the lead 11 directly to the grid 3 of the pentode tube 12. Also the output from anode 2 is supplied by means of the dephasing coupling circuits 14, 15 and 16 to the input grid 4 of the second pentode 17 of the phase detector. While the coupling circuits for dephasing have been shown as consisting of a triply tuned coupling transformer a doubly tuned coupling transformer may be equally well utilized. In fact any other tuned coupling circuits or delay lines may be employed.

The adjustable condensers of the circuits 14, 15 and 16 are adjusted so that the signal applied to the input grid of tube 17 is approximately 90° out of phase with the signal applied to tube 12 at the nominal carrier frequency. The dephasing or delay circuit has a linear phase shift characteristic, that is, the phase shift varies linearly with frequency; such circuits being well known in the art no further description is necessary. The phase shift produced should vary linearly over the deviation range of the signal from substantially less than 90° (e. g. 30°) at one end of the band to substantially more than 90° (e. g. 150°) at the other end of the band.

As has been mentioned above the two pentode tubes 12 and 17 are class B amplifiers so biased that each is cut off during a half cycle of the applied high frequency current. The voltage divider, consisting of resistors 23, 24 and 25 keeps the cathodes 5 and 6 of the tubes 12 and 17, respectively, positive with respect to the grounded grid returns. The load resistor designated as 18 has so high a value that when either pentode is conducting the common plate potential is at or near the cathode potential and the plate current is less than approximately 2 milliamperes.

Figure 3:
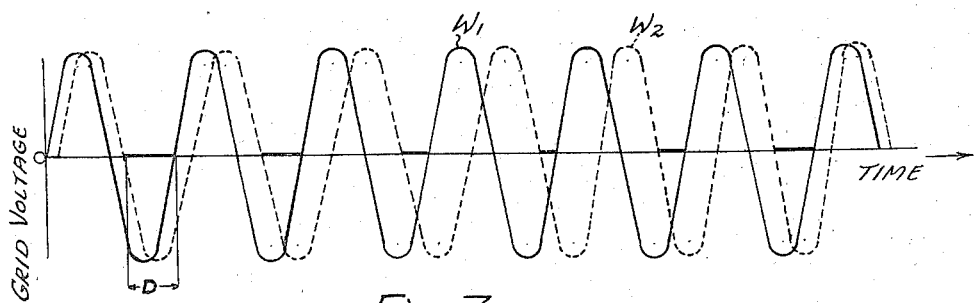
Figure 3 is a curve of grid voltage plotted against time for the input grids of the two tubes.

Reference may now be had to Fig. 3 in which the sine wave $W_1$, shown in solid lines, is representative of the frequency-modulated carrier wave applied to the control grid 3 of pentode 12, and in which the sine wave $W_2$, shown in dotted lines, is representative of the frequency-modulated carrier wave applied to control grid 4 of pentode 17. Under the bias conditions as stated, the pentodes individually are cut off whenever the alternating voltage applied to their respective grids falls below the zero grid voltage axis. The pentodes are jointly cut off during the briefer intervals D, when both sine waves fall below the zero axis.

Figure 4:
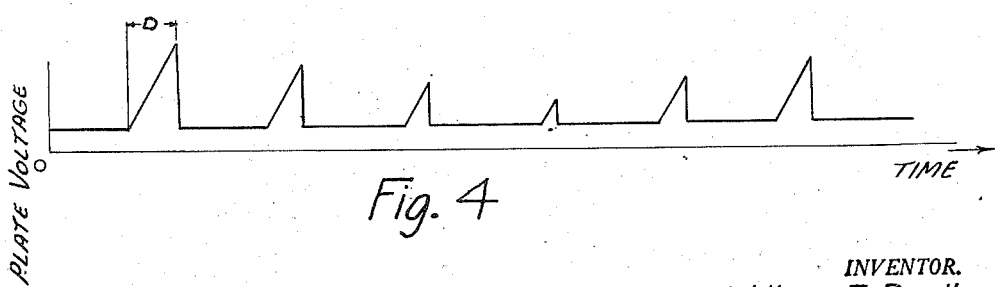
Figure 4 is a curve of the common plate voltage, i. e. the output voltage, of the two tubes plotted against time.

The same intervals D are illustrated in Fig. 4, which shows a graph of the common anode voltage of pentodes 12 and 17 plotted against time. As indicated above, the resistance of load resistor 18 is so high that, when either of the pentodes conducts, the said anode voltage is at or near cathode potential. However, when both pentodes 12 and 17 are cut off, which occurs only during the intervals D (Figs. 3 and 4), the potential of their anodes 7 and 8 respectively, rises exponentially but substantially linearly, as indicated in Figure 4, due to the fact that the plate to ground capacity 21 charges through the high resistance 18, at a nearly constant rate toward the charging potential, B+. However, as soon as either pentode 12 or 17 again begins to conduct the capacity 21 is discharged by the plate current flowing in the conducting tube. The plate current of the tubes 12 and 17 is sufficiently large so that the discharge is completed in a small fraction of a high frequency cycle.

Clearly now, the maximum positive potential attained by the point 20 (Figures 1 and 2) during the high frequency cycle depends upon the duration of the time interval during which both pentodes 12 and 17 are cut off. Consequently, the peak plate potential, as well as the average plate potential of point 20, is a measure of the relative phase of the two high frequency waves applied to the grids 3 and 4 of the pentodes 12 and 17, and the curve of Figure 4 has pronounced audio frequency characteristics.

Thus the output may be used in any convenient manner. For example, it may be detected by the conventional self biased band detector 22 of Figure 1 and the output thereof will be a wave exactly similar to the original audio signal.

Figure 2:
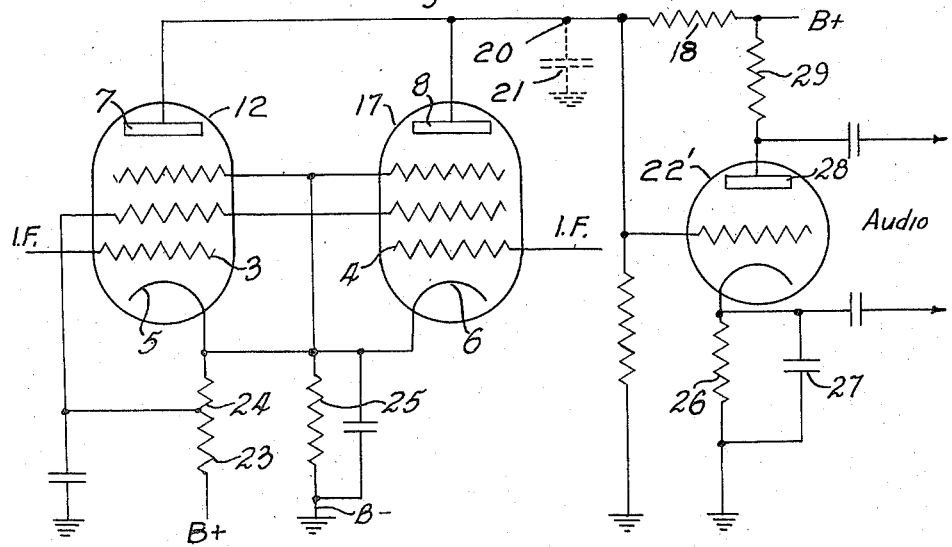
Figure 2 is a schematic view similar to Figure 1 omitting the input circuit but showing an alternative form of output circuit, the input circuit not being shown since it may be identical with that shown in Figure 1.

In some instances the infinite impedance detector of Figure 2 may be preferable to the detector of Figure 1. Except for the showing of the detector and the omission of the input circuit of the pentode tubes 12 and 17, Figure 2 is essentially similar to Figure 1 and therefore similar parts have been given the same reference characters.

The infinite impedance detector consists of triode 22', having cathode resistor 26, bypassed for the carrier frequency by the condenser 27. The audio output may be taken across resistor 26 in the usual way, in which case the conventional connection of the anode 28 directly to the B plus terminal may be used, but I have chosen to illustrate this detector as having resistor 29 connecting its anode 28 to the B plus terminal to provide push-pull signals at the audio output terminals.

Of course the two amplitude modulation detectors of Figures 1 and 2 are merely illustrative and any other conventional amplitude modulation detector may be utilized.

While I have described a preferred embodiment of my invention it is obvious that other embodiments and constructions may be adopted without departing from the spirit thereof and, consequently, I desire to be limited, not by the foregoing description, but solely by the scope of the appended claims.

What is claimed is:

1. In a detector for frequency modulated signals, in combination, a pair of electron discharge tubes having plate and input circuits, each of which tubes is biased to cut-off in the absence of input signals applied thereto, a common plate circuit for said tubes including a shunt capacitance and a series resistance, and means to apply the signal to be detected to the input circuits of said tubes in dephased relationship, said means comprising a dephasing network interposed between the signal source and the input circuit of at least one of said tubes.

2. In a detector for frequency modulated signals, in combination, a pair of electron discharge tubes having plate and input circuits, each of which tubes is biased to cut-off the absence of input signals applied thereto, a common plate circuit for said tubes including a shunt capacitance and a series resistance, and means to apply the signal to be detected to the input circuits of said tubes in dephased relationship, said means comprising a dephasing network interposed between the signal source and the input circuit of at least one of said tubes, said dephasing network having a substantially linear phase shift characteristic.

3. In a detector for frequency modulated signals, in combination, a pair of electron discharge tubes having plate and input circuits, each of which tubes is biased to cut-off in the absence of input signals applied thereto, a common plate circuit for said tubes, and means to apply the signal to be detected to the input circuits of said tubes in dephased relationship, said means comprising a dephasing network interposed between the signal source and the input circuit of at least one of said tubes, and a load resistor in said common plate circuit, said load resistor being of such high value that when either tube is conducting the plate potential is substantially that of the cathode, and when both tubes are non-conducting the plate-to-ground capacity of the tubes is charged substantially linearly, said charging continuing until either of said tubes becomes conducting whereby the voltage of said capacity depends directly upon the interval in which the tubes are both nonconducting.

4. In a detector for frequency modulated signals, in combination, a pair of electron discharge tubes having plate and input circuits, each of which tubes is biased to cut-off in the absence of input signals applied thereto, a common plate circuit for said tubes, and means to apply the signal to be detected to the input circuits of said tubes in dephased relationship, said means comprising a dephasing network interposed between the signal source and the input circuit of at least one of said tubes, and a load resistor in said common plate circuit, said load resistor being of such high value that when either tube is conducting the plate potential is substantially that of the cathode and when both tubes are non-conducting the plate-to-ground capacity of the tubes is charged substantially linearly, said charging continuing until either of said tubes becomes conducting whereby the voltage of said capacity depends directly upon the interval in which the tubes are both non-conducting, said charge being dissipated immediately upon either of said tubes becoming conducting, the dissipation being substantially instantaneous.

5. In a detector for frequency modulated signals, in combination, a pair of pentode tubes, each of which is biased to cut-off in the absence of input signals applied thereto, a common plate circuit for said tubes including a shunt capacitance and a series resistance, and means to apply the signal to be detected to the input circuits of said pentodes in dephased relationship, said means comprising a dephasing network interposed between the signal source and the input circuit of at least one of said pentodes.

6. In a frequency detector, a source of signals, the frequency of which is modulated, a capacitance, a source of unidirectional voltage, a resistance, connections between said source of unidirectional voltage, said resistance and said capacitance to provide for charging said capacitance, a pair of discharge devices connected for discharging said capacitance, said devices having input connections, the conductivity of said discharge devices being modified substantially by the application of input signals thereto, two paths connecting said source of signals respectively to said input connections, a common return path for said sources and said discharge devices, and phase changing means connected in at least one of said paths, for changing the relative phase of the signals applied to said discharge device input connections as the frequency of said signal changes.

7. In a frequency detector, a source of signals, the frequency of which is modulated, a capacitance, a source of unidirectional voltage, a resistance, connections between said source of unidirectional voltage, said resistance and said capacitance to provide for charging said capacitance, a pair of discharge devices connected for discharging said capacitance, said devices having input connections, the conductivity characteristics of said discharge devices being such that they are rendered conducting when positive input signals are applied thereto and non-conducting when negative signals are applied thereto, two paths connecting said source of signals respectively to said input connections, a common return path for said sources and said discharge devices, and phase changing means connected in at least one of said paths, for changing the relative phase of the signals applied to the said discharge device input connections as the frequency of said signal changes.

WILLIAM E. BRADLEY.

REFERENCES CITED

The following references are of record in the file of this patent:

UNITED STATES PATENTS

| Number | Name | Date |
| --- | --- | --- |
| 2,230,212 | Crosby | Jan. 28, 1941 |
| 2,263,615 | Crosby | Nov. 25, 1941 |